(12) United States Patent
Won

(10) Patent No.: US 8,146,919 B2
(45) Date of Patent: Apr. 3, 2012

(54) IMAGE READING APPARATUS AND DOCUMENT SUPPLY DEVICE THEREOF

(75) Inventor: Jin Sik Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 12/015,711

(22) Filed: Jan. 17, 2008

(65) Prior Publication Data

US 2009/0086287 A1    Apr. 2, 2009

(30) Foreign Application Priority Data

Feb. 15, 2007    (KR) .................. 10-2007-0016014

(51) Int. Cl.
*B65H 39/10*    (2006.01)
(52) U.S. Cl. ......... 271/301; 271/225; 271/302; 271/303
(58) Field of Classification Search .................. 271/145, 271/225, 301, 302, 303
See application file for complete search history.

(56) References Cited

U.S. PATENT DOCUMENTS

| | | | | |
|---|---|---|---|---|
| 5,449,164 A | * | 9/1995 | Quesnel et al. | 271/186 |
| 5,669,056 A | * | 9/1997 | Rubscha | 399/367 |
| 5,926,681 A | * | 7/1999 | Ishimaru | 399/367 |
| 5,991,592 A | * | 11/1999 | Kobayashi et al. | 399/374 |
| 6,161,831 A | * | 12/2000 | Kusakabe et al. | 271/186 |
| 6,209,861 B1 | | 4/2001 | Kakuta et al. | |
| 6,215,976 B1 | * | 4/2001 | Shida et al. | 399/367 |
| 6,522,860 B2 | * | 2/2003 | Nose et al. | 399/374 |
| 6,698,752 B1 | * | 3/2004 | Kakuta et al. | 271/188 |
| 7,611,145 B2 | * | 11/2009 | Iwago et al. | 271/291 |
| 2006/0214351 A1 | * | 9/2006 | Watanabe | 271/3.14 |

FOREIGN PATENT DOCUMENTS

| | | |
|---|---|---|
| CN | 1700107 | 11/2005 |
| JP | 11-157756 | 6/1999 |

OTHER PUBLICATIONS

Chinese Office Action issued Dec. 11, 2009 in CN Application No. 200810009039.4.

* cited by examiner

*Primary Examiner* — Michael McCullough
*Assistant Examiner* — Howard Sanders
(74) *Attorney, Agent, or Firm* — Stanzione & Kim, LLP

(57) ABSTRACT

An image reading apparatus, a document supply device thereof and methods thereof may reduce a scanning operation time. A document supply device may include a holding position (e.g., internal) for a following document such that a scanning time between documents may be reduced. The document supply device may include a main feed path to guide an introduced document, a simplex path coupled to the main feed path and to guide the document fed through the main feed path to the scanning window to scan one document surface (e.g., first surface), a duplex path to guide the document having passed the scanning window to the simplex path to scan the other document surface (e.g., second surface), an auxiliary supply path coupled to the main feed path and the simplex path where the document fed through the main feed path temporarily stands by before being fed to the scanning window.

10 Claims, 11 Drawing Sheets

IMAGE READING APPARATUS AND DOCUMENT SUPPLY DEVICE THEREOF

CROSS-REFERENCE TO RELATED APPLICATIONS

This application claims the benefit of Korean Patent Application No. 2007-0016014, filed on Feb. 15, 2007 in the Korean Intellectual Property Office, the disclosure of which is incorporated herein by reference.

BACKGROUND OF THE INVENTION

1. Field of the Invention

The present general inventive concept relates to an image reading apparatus and method, and more particularly to an image reading apparatus and a document supply device thereof that is capable of duplex scanning of a document.

2. Description of the Related Art

An image reading apparatus is an apparatus that is capable of converting letters or pictures printed on a document into an image signal. An image reading apparatus can be classified as a scanner, a multi-function printer having an image reading function, a fax machine, and the like.

An image reading apparatus includes a transparent document plate on which a document is positioned, and an image reading unit which is movably mounted below the document plate and scans letters or pictures of the document. The image reading unit irradiates light to the document put on the document plate, and detects the light reflected from the document to generate voltage proportional to the light intensity and convert the light intensity into a constant pixel pattern. The image reading unit includes a lamp which irradiates light, and an image sensor which receives the light reflected from the document and converts the same into an image signal. The image sensor may be configured as a charge-coupled device (CCD), a contact image sensor (CIS) or the like.

An image reading apparatus can be classified roughly as a flat bed type or a sheet feed type. A flat bed type image reading apparatus, e.g., a copying machine, is configured such that a document to be scanned is fixedly put on a flat document plate and an image sensor moves to scan the document. A sheet feed type image reading apparatus, e.g., a fax machine, is configured such that an image sensor is fixedly mounted and a document moves to be scanned sheet by sheet. Recently, an image reading apparatus adopting both flat bed type and sheet feed type has been developed.

A sheet feed type image reading apparatus requires a document supply device which automatically feeds a document to a scanning window. The document supply device includes a document supply tray on which one or more sheets of documents are loaded, and a plurality of rollers to feed the document on the document supply tray to a document discharge tray via the scanning window.

An image reading apparatus which is recently available on the market has a duplex (two-sided) scanning function where a document supply device automatically feeds a document on a document supply tray to a document discharge tray via a scanning window such that one surface and the other surface of the document sequentially pass by an image sensor. In other words, the document supply device of the image reading apparatus having the duplex scanning function feeds the document so that a first surface of the document is scanned by the image sensor while passing by the scanning window, and then reversely feeds the document having passed the scanning window and before being discharged outside so that the other surface of the document is scanned by the image sensor while passing by the scanning window.

However, because the related art image reading apparatus has a structure such that the document is reversed in a document feed path from the document supply tray to the document discharge tray, a time required to scan each sheet of document is increased or relatively long, and such an image reading apparatus can have a difficulty of accurately regulating a document feed timing when successively scanning multiple documents loaded on the paper supply tray.

Thus, there exists a need for a document feed path or a document feed timing to decrease a scanning time.

SUMMARY OF THE INVENTION

The present general inventive concept provides an image reading apparatus and a document supply device thereof that is capable of decreasing a duplex scanning time or modifying a document feed path and/or a document feed timing and an operating method thereof.

Additional aspects and/or utilities of the general inventive concept will be set forth in part in the description which follows and, in part, will be obvious from the description, or may be learned by practice of the present general inventive concept.

The foregoing and/or other aspects and utilities of the present general inventive concept may be achieved by providing an image reading apparatus including a base body configured with a scanning window, an image reading unit in correspondence with the scanning window and to convert an image of a document into an electric image signal and a document supply device coupled to the base body to feed the document to the scanning window, the document supply device including a main feed path to guide the document introduced through a document supply port, a simplex path to guide the document fed through the main feed path to the scanning window to scan one surface of the document, a duplex path to guide the document having passed the scanning window to the simplex path to scan the other surface of the document, an auxiliary supply path coupled to the main feed path and the simplex path to temporarily hold the document fed through the main feed path before the temporarily held document is fed to the scanning window, and rollers to feed the document through the main feed path, the simplex path, the duplex path and the auxiliary supply path.

The auxiliary supply path may include an overturn path branched off from the main feed path and to guide the document so that upper and lower surfaces of the document are turned over, and an auxiliary feed path to guide the document fed to the overturn path to the simplex path.

The auxiliary feed path may be provided with an overturn roller that can rotate in a forward direction and a reverse direction. When the overturn roller rotates in the forward direction, the document from the main feed path may be fed to the overturn path, and when the overturn roller rotates in the reverse direction, the document from the overturn path may be fed to the simplex path through the auxiliary feed path.

The auxiliary feed path may be provided with an overturn sensor to detect the document fed to the auxiliary feed path.

The image reading apparatus may further include a first document guide mounted at a junction portion of the main feed path, the simplex path and the auxiliary supply path. The first document guide may selectively guide the document from the main feed path to the simplex path or the auxiliary supply path.

A frame may be provided with a document discharge port to discharge the document having passed the scanning window, and a discharge roller near the document discharge port may feed the document having passed the scanning window. The discharge roller may rotate in a forward direction and a reverse direction. When the discharge roller rotates in the forward direction, the document having passed the scanning window may feed to the document discharge port, and when the discharge roller rotates in the reverse direction, the document having passed the scanning window may feed to the duplex path.

The image reading apparatus may further include a second document guide positioned between the scanning window and the discharge roller to guide the document fed by the reverse rotation of the discharge roller to the duplex path.

The image reading apparatus may further include a discharge idle roller configured to contact the discharge roller to enable the discharge roller to feed the document or separate from the discharge roller to prevent or reduce the discharge roller influence on the feeding of the document.

The image reading apparatus may further include a discharge sensor between the scanning window and the document discharge port to detect the document passing by the scanning window.

The simplex path may be provided with a scan roller (e.g., on an upstream side of the scanning window) to feed the document introduced into the simplex path to the scanning window. The scan roller may register a front end of the document fed to the simplex path.

The simplex path may be further provided with a scan sensor (e.g., on an upstream side of the scan roller) to detect the document passing through the simplex path.

The image reading apparatus may further include a document supply tray mounted to the frame to load the document to be supplied to the document supply port. The document supply tray may have a foldable configuration.

The foregoing and/or other aspects and utilities of the present general inventive concept may also be achieved by providing a document supply device of an image reading apparatus including a frame configured to have a document supply port, a main feed path to guide a document introduced through the document supply port, a simplex path branched off the main feed path to guide the document from the main feed path to a scanning window to scan one surface of the document, a duplex path to guide the document having passed the scanning window to the simplex path to scan the other surface of the document, an auxiliary supply path branched off from the main feed path and coupled to the simplex path configured to temporarily position the document fed through the main feed path before being fed to the scanning window, and rollers to feed the document through the main feed path, the simplex path, the duplex path and the auxiliary supply path.

The foregoing and/or other aspects and utilities of the present general inventive concept may also be achieved by providing an image reading apparatus including an image reading unit to convert an image of a document into an electric image signal and a document supply device to position the document relative to the image reading unit, the document supply device to include a main feed path to guide the document introduced through a document supply port of the image reading apparatus, a simplex path to guide the document from the main feed path to the image reading unit to scan a first surface of the document, a duplex path to guide the document to scan a second surface of the document, and an auxiliary supply path to temporarily position the document and to output the document to the simplex path.

The foregoing and/or other aspects and utilities of the present general inventive concept may also be achieved by providing an image reading method including inputting a first document through a document supply port of an image reading apparatus to an auxiliary supply path, guiding the first document from the auxiliary supply path to a simplex path leading to a document discharge port for a first time and guiding the first document to a duplex path to guide the document to the simplex path for a second time.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF EMBODIMENTS

Figure 1:
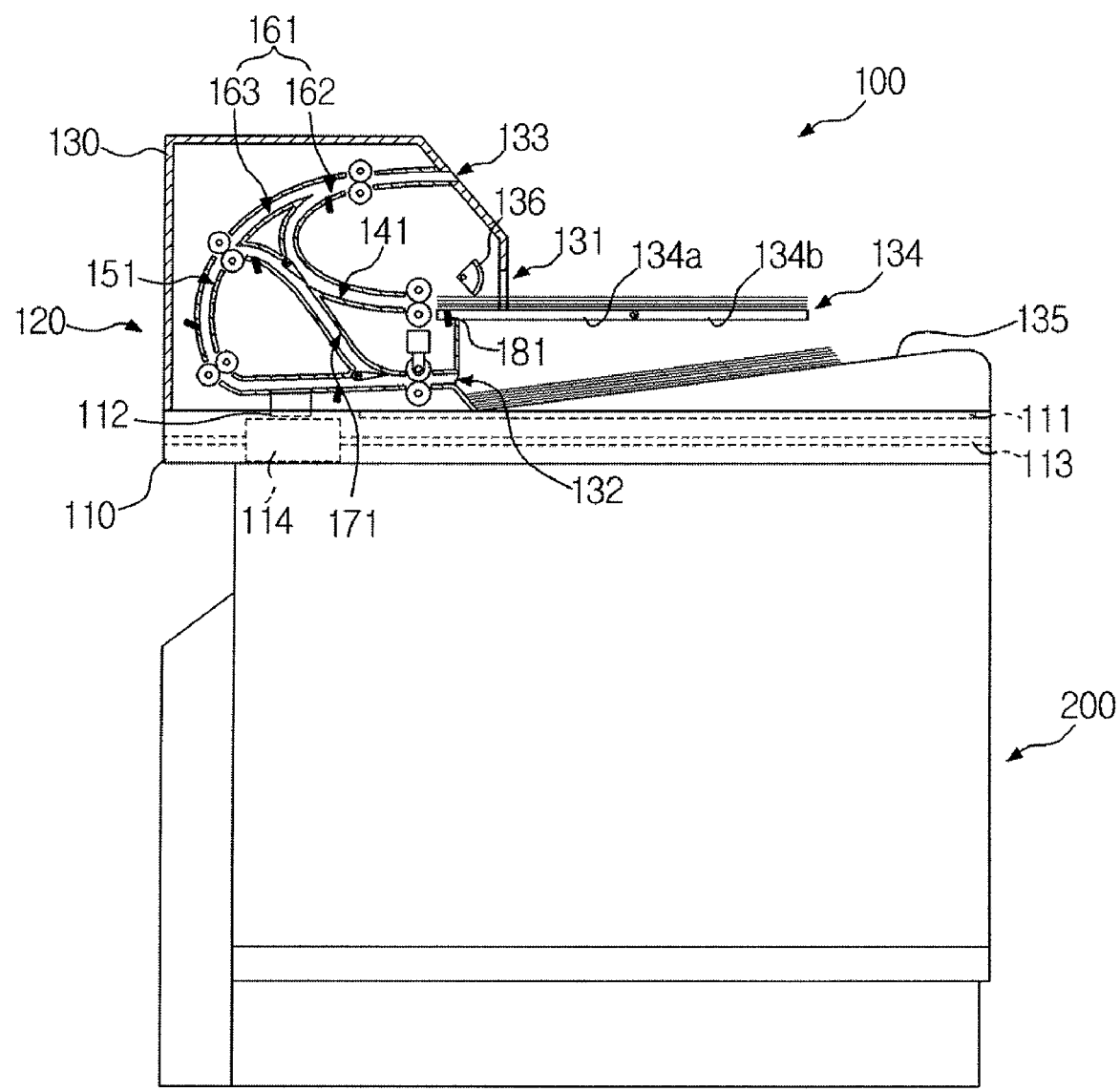
FIG. 1 is a side-sectional view schematically illustrating a multi-function printer provided with an image reading apparatus in accordance with an exemplary embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

FIG. 1 illustrates an exemplary embodiment of a multi-function printer provided with an image reading apparatus. FIG. 1 illustrates a multi-function printer in which an image reading apparatus 100 can be mounted on an image forming apparatus 200.

The image reading apparatus 100 is configured to achieve both a flat bed type of scanning and a sheet feed type of scanning. The image reading apparatus 100 may include a base body 110 having a transparent document plate 111 on which a document is positioned sheet by sheet and a transparent scanning window 112 by which the document passes; an image reading unit 114 that may reciprocally move corresponding to the document plate 111 and the scanning window 112; and a document supply device 120 that automatically supplies plural documents to the scanning window 112. The image reading unit 114 may be movably mounted along a guide bar 113 disposed below the document plate 111 and the scanning window 112.

The image reading unit 114 may irradiate light to the document and detect the light reflected from the document to convert the light intensity into an electric image signal. The image reading unit 114 includes a source such as a lamp (not shown) that irradiates light, and an image sensor (not shown) that receives the light reflected from the document. The image sensor may be configured as a charge-coupled device (CCD) or a contact image sensor (CIS). Since such an image reading unit 114 is well known in the art, a detailed explanation thereof will be omitted here.

Figure 2:
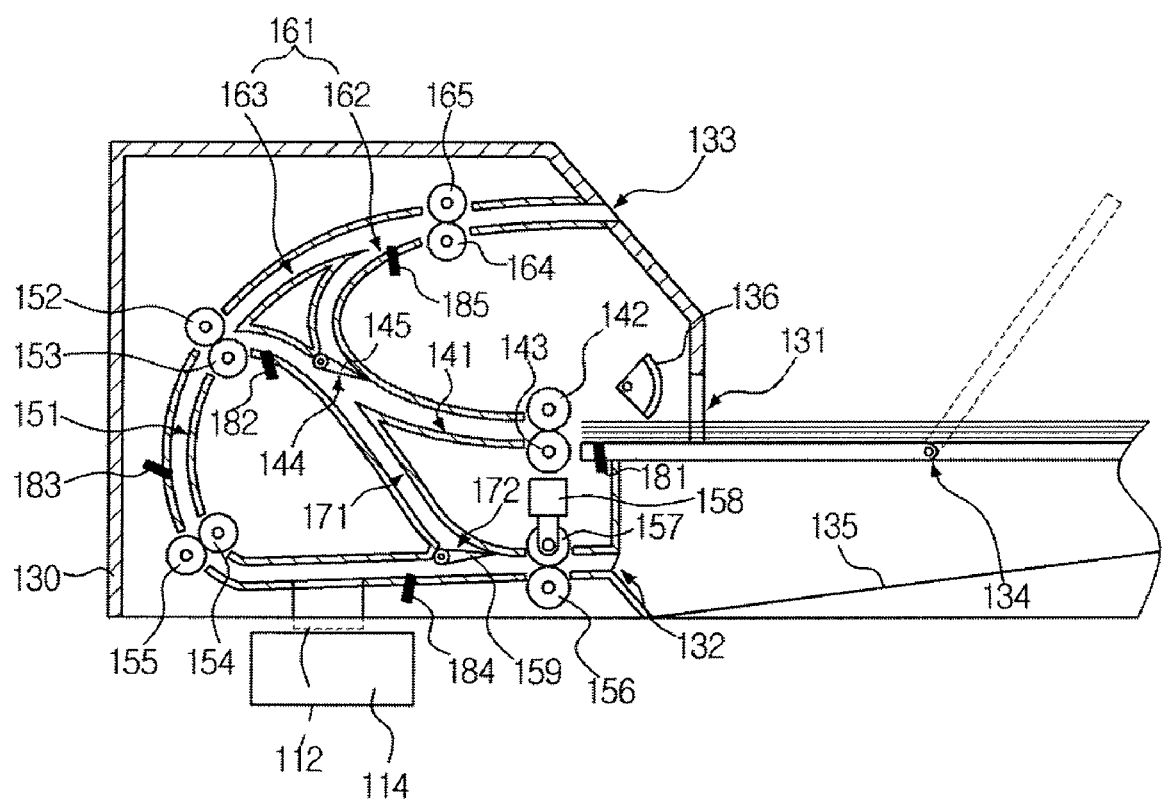
FIG. 2 is a side-sectional view schematically illustrating the image reading apparatus in accordance with an exemplary embodiment of the present general inventive concept.

As illustrated in FIGS. 1 and 2, the document supply device 120 can include a frame 130 that is mounted on the base body 110 with a document supply port 131 and a document discharge port 132, a document supply tray 134 coupled to the frame 130 on which plural documents are loaded, a document discharge tray 135 coupled to the frame 130 to collect the documents discharged through the document discharge port 132, a pickup device 136 to pick up the document loaded on the document supply tray 134, rollers 142, 152, 154, 156 and 164 to feed the picked-up document, and sensors 181, 182, 183, 184 and 185 at a document feed path from the document supply port 131 to the document discharge port 132 to detect the document fed (e.g., by the rollers) along the document feed path. Between the document supply port 131 and the document discharge port 132 inside the frame 130, there are preferably provided a main feed path 141, a simplex path 151, an auxiliary supply path 161, and a duplex path 171. The sensors 181, 182, 183, 184 and 185 may be configured as various types of sensors such as a lever sensor, an optical sensor, or the like. The sensors 181, 182, 183, 184 and 185 may transmit a document detecting signal to a control unit (not shown), and enable the control unit to control the operation of the overall apparatus, including the rollers 142, 152, 154, 156 and 164 and the image reading unit 114.

The document supply tray 134 may be mounted above the document discharge tray 135 at a predetermined gap from the document discharge tray 135. The document supply tray 134 includes a first loading part 134a that may be fixed to the frame 130, and a second loading part 134b hingedly coupled to the first loading part 134a. Upon rotating the second loading part 134b upward about a connection (e.g., hinge portion) with the first loading part 134a, a user can easily draw out the documents from the document discharge tray 135. A document loading sensor 181 may be mounted to the document supply tray 134 to detect the documents loaded on the document supply tray 134.

The main feed path 141 can guide the document picked up from the document supply tray 134 to the simplex path 151 and the auxiliary supply path 161. A feed roller 142 and an idle roller 143 to contact the feed roller 142 may be mounted to an originating portion of the main feed path 141. The feed roller 142 together with the idle roller 143 engage or rotate to feed the document that is picked up by the pickup device 136.

The simplex path 151 can guide the document fed through the main feed path 141 to the document discharge port 132 via the scanning window 112. The simplex path 151 may branch off (e.g., from a terminating portion) of the main feed path 141. When the simplex (one-sided) scanning operation is performed, the simplex path 151 guides the document fed through the main feed path 141 to the scanning window 112 so that one surface (e.g., an upper surface) of the document is scanned. The simplex path 151 and the auxiliary supply path 161 may be bifurcated from the terminating portion of the main feed path 141. A first document guide 144 is preferably mounted in a junction portion 145 of the main feed path 141, the simplex path 151 and the auxiliary supply path 161. The first document guide 144 may selectively guide the document fed through the main feed path 141 to the simplex path 151 or the auxiliary supply path 161.

When the simplex scanning operation is performed, the first document guide 144 may block the auxiliary supply path 161 and guide the document to the simplex path 151. When the duplex scanning operation is performed, the first document guide 144 may open the auxiliary supply path 161 (e.g., block the simplex path 151) to guide the document to the auxiliary supply path 161. The first document guide 144 may operate by a driving device, e.g., a solenoid or the like.

In the simplex path 151, there are provided a feed roller 152 and an idle roller 153 to feed the received document fed from the main feed path 141 or the auxiliary supply path 161, a scan roller 154 and an idle roller 155 to feed the document fed by the feed roller 152 to the scanning window 112, and a discharge roller 156 and a discharge idle roller 157 to feed the document that passed by the scanning window 112. The scan roller 154 has a function as a register roller that may compensate skew of the document. For example, the scan roller 154, which is kept in a stationary state, may initiate its rotation using a power switching device (e.g., an electronic clutch) at a predetermined time after the document arrives at the scan roller 154 to register the front end of the document and then the document is fed to the scanning window 112.

The discharge roller 156 can rotate in a forward direction and a reverse direction. When rotating in the forward direction, the discharge roller 156 may discharge the document having passed the scanning window 112 through the document discharge port 132. When rotating in the reverse direction, the discharge roller 156 may feed the document, preferably having one surface already scanned, to the duplex path 171. The discharge idle roller 157 is configured to engage or disengage (e.g., ascend and descend by an elevation device 158) so that the discharge idle roller 157 moves away from or contacts the discharge roller 156. If the discharge idle roller 157 moves away from the discharge roller 156, the discharge roller 156 does not have an influence on the feeding of the document even when it rotates.

In the simplex path 151, a document interval adjusting sensor 182 may be mounted on an upstream side of the feed roller 152, a scan sensor 183 may be mounted on an upstream side of the scan roller 154, and a discharge sensor 184 may be mounted on an upstream side of the discharge roller 156. When successively scanning the documents, the document interval adjusting sensor 182 may function to maintain the regular interval between the preceding sheet of a document and the following sheet of a document. For example, when the rear end of the preceding sheet of a document passes by the document interval adjusting sensor 182, the document interval adjusting sensor 182 transmits the corresponding detecting signal to the control unit, and the control unit may control the feeding of the following sheet of the document so that the following sheet of the document is fed at a predetermined interval relative to the preceding sheet of the document. The scan sensor 183 may detect in advance the document fed toward the scanning window 112 and enable the document reading unit 114 mounted below the scanning window 112 to timely scan the document passing by the scanning window 112. The discharge sensor 184 may detect the scanned document to enable the control unit to control the discharge roller 156 to timely rotate in the forward direction or the reverse direction and/or the discharge idle roller 157 to timely ascend or descend. During the duplex scanning operation, the discharge sensor 184 preferably detects the document that has been scanned and is fed toward the document discharge port 132 so that when the rear end of the document is located at a predetermined position (e.g., preferably, the rear end of the document is located near (e.g., 15 to 20 mm from) the discharge roller 156), the rotational direction of the discharge roller 156 may be reversed to feed the document to the duplex path 171

The duplex path 171 may guide the document, of which one surface has been scanned, to the simplex path 161 to scan the other surface of the document. For example, the rear end of the document, which is fed toward the document discharge port 132 after one surface has been scanned, may advance into the duplex path 171 by the reverse rotation of the discharge roller 156. A second document guide 159 may be mounted at a junction portion 172 of the simplex path 151 and the duplex path 171 to guide the document, which is preferably reversely fed by the reverse rotation of the discharge roller 156, to the duplex path 171. Similarly to the first document guide 144, the second document guide 159 may operate by a driving device, e.g., a solenoid.

When successively supplying the documents, the auxiliary supply path 161 may provide a standby space in which the document can temporarily stand by before being fed to the simplex path 151. The auxiliary supply path 161 may include an overturn path 162 to guide the supplied document so that the upper and lower surfaces of the document are turned over (e.g., reversed or flipped over), and an auxiliary feed path 163 to guide the document fed to the overturn path 162 to the simplex path 151. The overturn path 162 may extend from the main feed path 141 to an opening 133 provided at the frame 130, and have a substantially C shape. However, exemplary embodiments and the present general inventive concept are not intended to be so limited as alternative configurations/ methods may be used for the auxiliary supply path so long as its function is provided. The auxiliary feed path 163 may couple the overturn path 162 and the simplex path 151, and guide the document in the overturn path 162 to the simplex path 151. An overturn roller 164 capable of rotating in a forward direction and a reverse direction and an idle roller 165 are positioned to correspond to (e.g., mounted in) the overturn path 162.

When the document advances into the overturn path 162 from the main feed path 141, the overturn roller 164 may rotate in the forward direction to feed the document toward the opening 133. When the document fed to the overturn path 162 is located at a predetermined position (e.g., preferably, the rear end of the document is located near the overturn roller such as a distance of 15 to 20 mm from the overturn roller 164), the overturn roller 164 may stop rotating to make the document temporarily stand by. Also, when the preceding sheet of the document prior to the standing-by document is fed to the document discharge tray 135, the overturn roller 164 may rotate in the reverse direction to feed the overturned document to the simplex path 151. An overturn sensor 185 is preferably mounted in the overturn path 162 to detect the document fed through the overturn path 162 so that when the document fed toward the opening 133 is located at a predetermined position, the overturn roller 164 stops rotating.

As described above, the following sheet of a document may temporarily stand-by in the auxiliary supply path 161, and then progress toward the scanning window 112 when the preceding sheet of document is fed to the document discharge tray 135, which can shorten or reduce the scanning time.

Operations of the image reading apparatus 100 according to the present general inventive concept will be described with reference to the annexed drawings.

Figure 3:
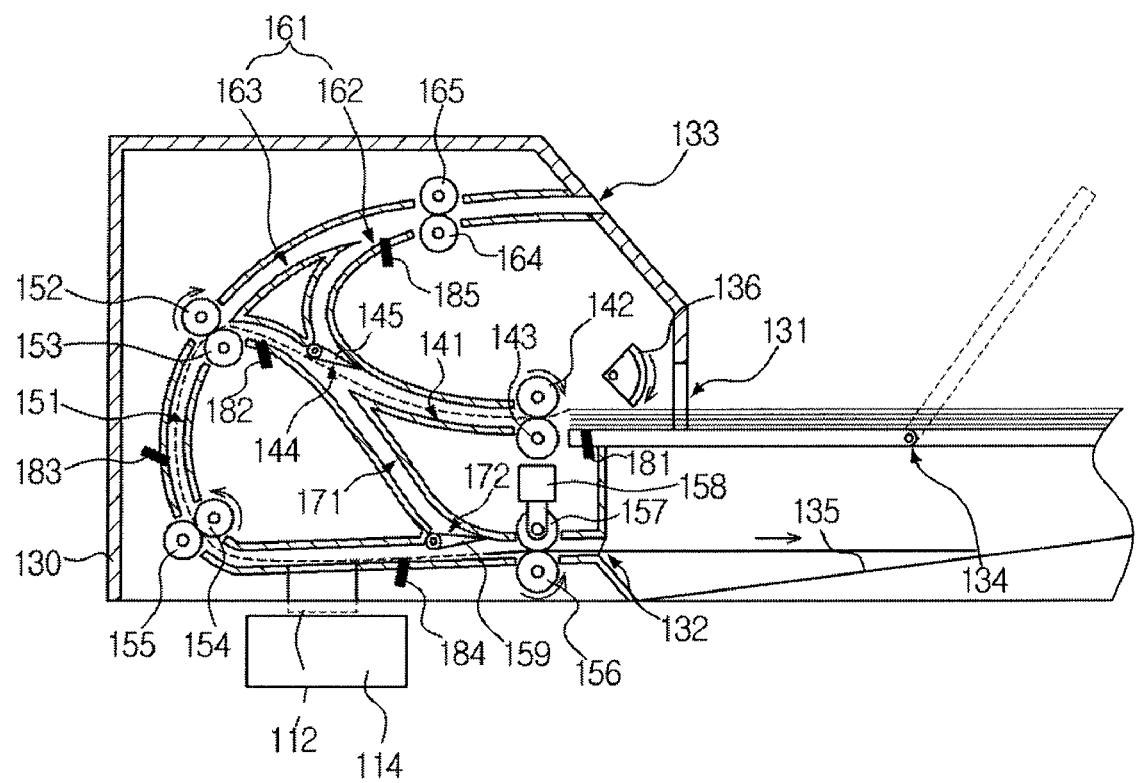
FIG. 3 is a side-sectional view illustrating the simplex (one-sided) scanning operation of the image reading apparatus in accordance with an exemplary embodiment of the present general inventive concept.

As illustrated in FIG. 3, when scanning one surface (e.g., the upper surface) of the document loaded on the document supply tray 134, the first document guide 144 blocks the overturn path 162 to prevent the supplied document from moving into the auxiliary supply path 161. When the pickup device 136 operates to pick up the document sheet by sheet, the feed roller 142 rotates to feed the picked-up document to the main feed path 141. The document fed by the feed roller 142 is fed to the simplex path 151 by the first document guide 144, and subsequently fed to the scan roller 154 by the feed roller 152. When the document is fed to the scan roller 154, the scan roller 154 preferably stops rotating to register the front end of the document, and then feeds the registered document to the scanning window 112. When the document passes by the scanning window 112, the image reading unit 114 irradiates a beam to the document to read an image from the document. The document having passed the scanning window 112 is fed by the discharge roller 156, which rotates in a first direction (e.g., the forward direction), and is discharged to the document discharge tray 135 through the document discharge port 132. As illustrated in FIG. 3, when the document is discharged to the document discharge tray 135, the document is put onto the document discharge tray 135 such that the upper and lower surfaces of the document are turned over from the state when the document was loaded on the document supply tray 134.

During the successive simplex scanning operation with respect to multiple documents or plural documents loaded on the document supply tray 134, when the rear end of the document fed toward the scanning window 112 passes a prescribed position. (e.g., detected by the document interval adjusting sensor 182), the pickup device 136 may pick up the next document. Accordingly, scanning processes in FIG. 3 can be rapidly performed one after another.

FIGS. 4A to 4D illustrate duplex (two-sided) scanning operations by which one surface and the other surface of the document(s) loaded on the document supply tray 134 may be scanned.

Figure 4A:
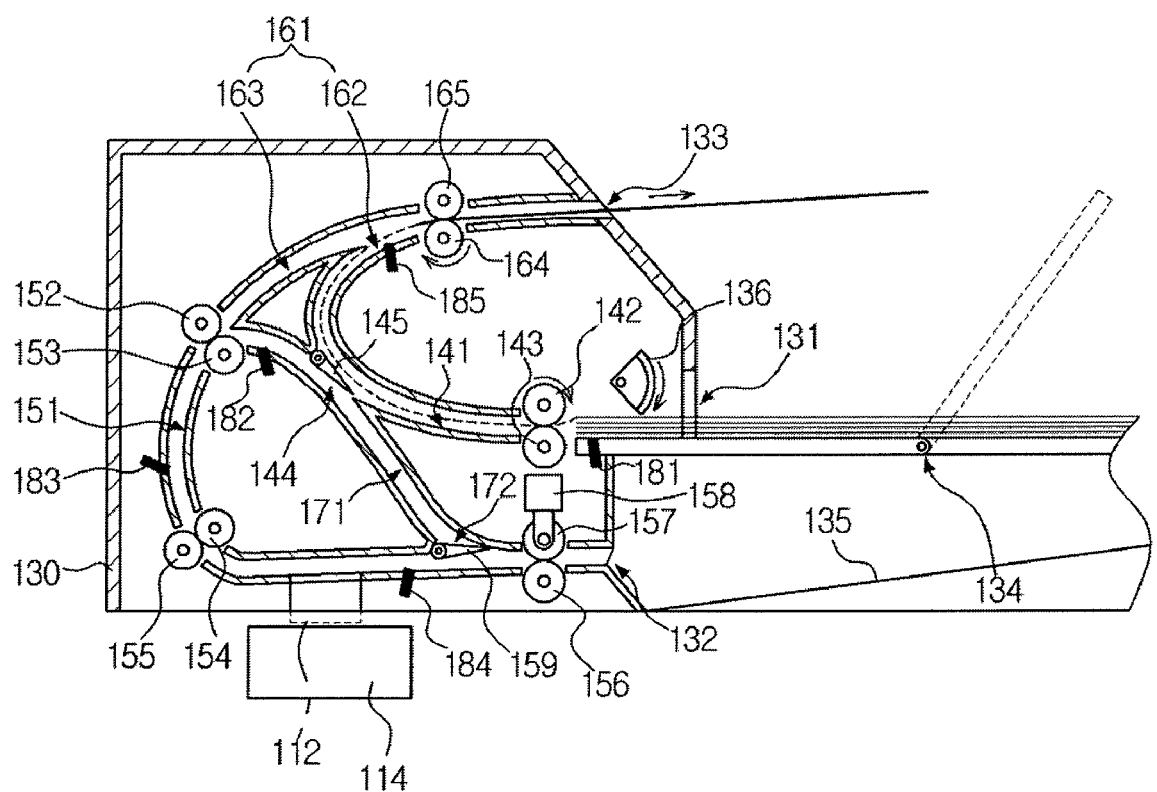
FIGS. 4A-4D are side-sectional views illustrating the duplex (two-sided) scanning operation of the image reading apparatus in accordance with an exemplary embodiment of the present general inventive concept.
Figure 4B:
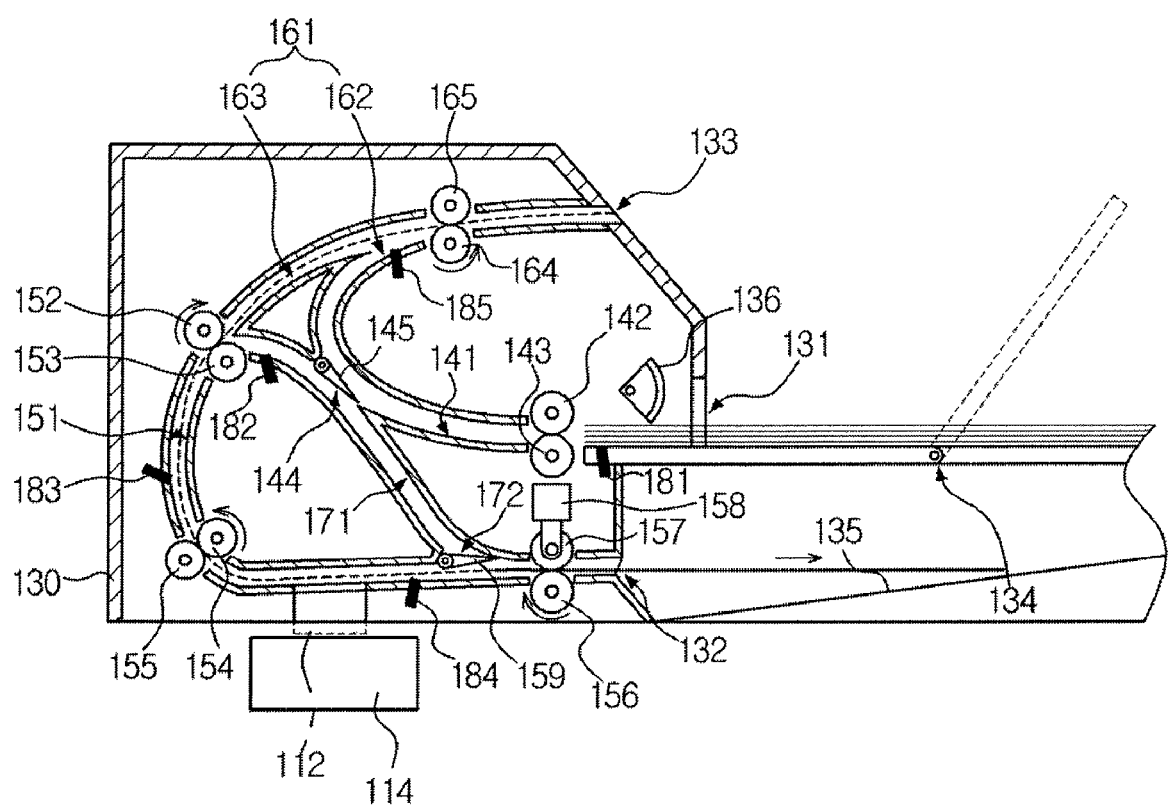

As illustrated in FIG. 4A, when performing the duplex scanning operation, the first document guide 144 opens the overturn path 162 and blocks the simplex path 151. Accordingly, the document picked up by the pickup device 136 is fed to the overturn path 162 by the feed roller 142. The document fed to the overturn path 162 may pass the overturn sensor 185, and a portion thereof can pass through the opening 133 by the overturn roller 164. At this time, the upper and lower surfaces of the document are turned over such that the surface facing down when the document is loaded on the document supply tray 134 is turned over to be facing up. When the document fed by the overturn roller 164 rotating in the forward direction is located at a predetermined position, the overturn roller 164 may rotate in the reverse direction to feed the document to the auxiliary feed path 163 as illustrated in FIG. 4B. The document fed to the auxiliary feed path 163 may be fed (e.g., continuously) to the scanning window 112 by the feed roller 152 and the scan roller 154. When the document passes by the scanning window 112, the image reading unit 114 scans one surface (e.g., a first surface) of the document.

The document having one surface already scanned may pass by the discharge sensor 184, and a portion thereof may pass through or exit the document discharge port 132 using the discharge roller 156. When the document fed toward the outside (e.g., the document discharge port 132) by the forward rotation of the discharge roller 156 is not totally discharged and is located at a predetermined position, the discharge roller 156 may rotate in the reverse direction to reversely feed the document.

Figure 4C:
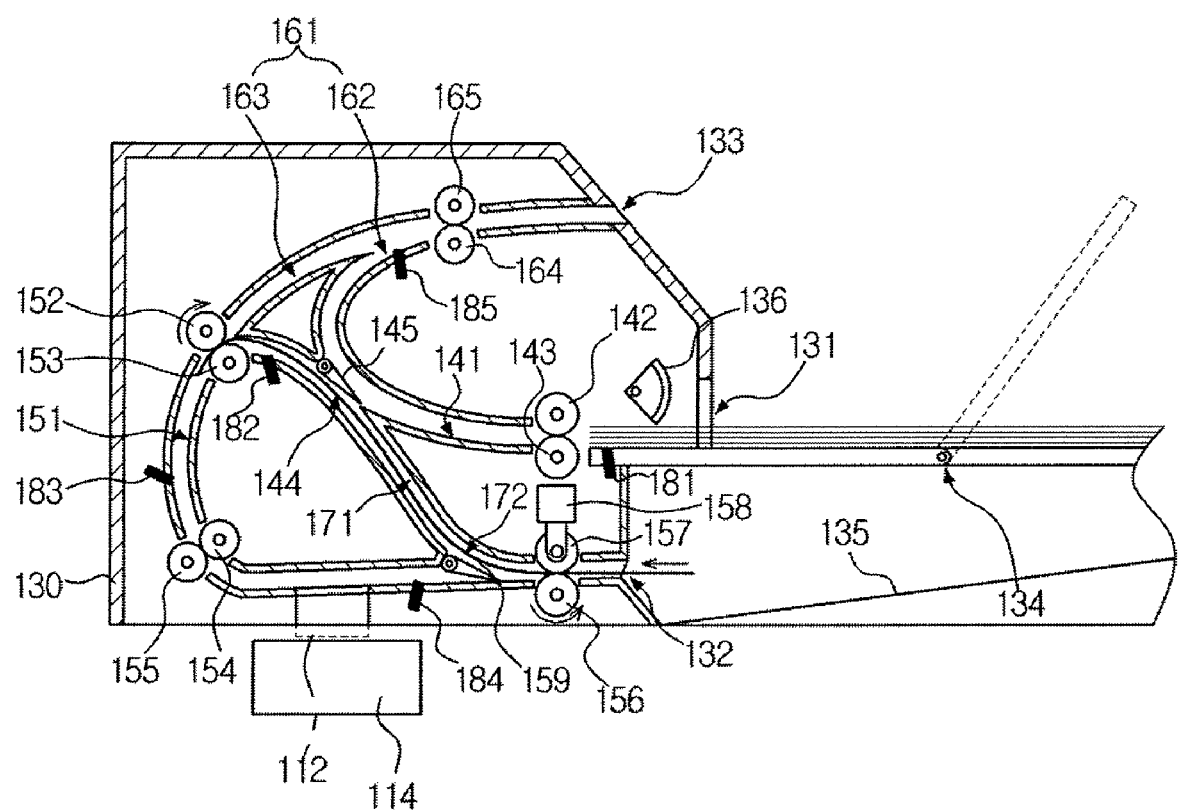

As illustrated in FIG. 4C, the second document guide 159 may open the duplex path 171 (e.g., block a back end of the simplex path 151) before the document is reversely fed, and guide the document reversely fed by the reverse rotation of the discharge roller 156 to the duplex path 171. The document fed through the duplex path 171 may advance into the simplex path 151, and be fed to the scanning window 112 by the feed roller 152 and the scan roller 154. When the document whose one surface has been scanned is fed to the scanning window 112 through the duplex path 171 and the simplex path 151, the upper and lower surfaces of the document are reversed or turned over so that the other non-scanned surface (e.g., a second surface) of the document is scanned while passing by the scanning window 112.

Figure 4D:
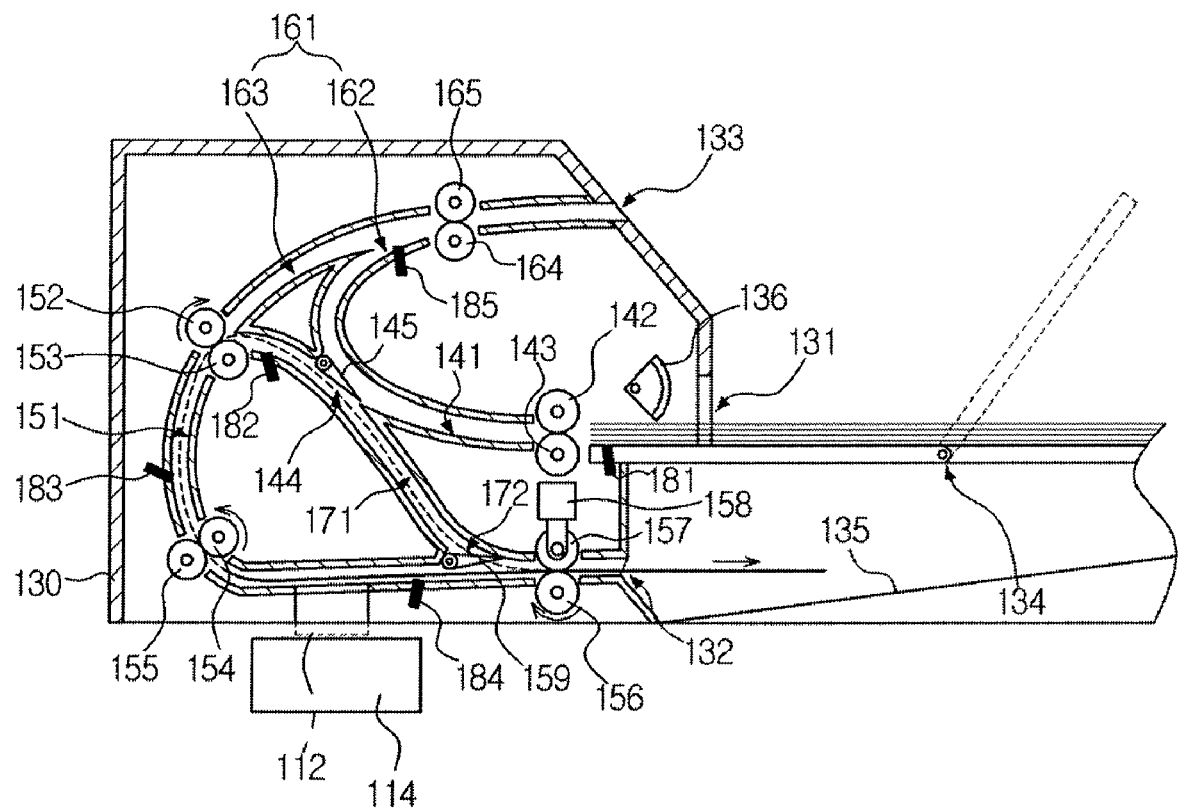

As illustrated in FIG. 4D, the duplex (two-sided) scanned document may finally be discharged to the document discharge tray 135 through the document discharge port 132 by the discharge roller 156 that rotates in the forward direction. At this time, the upper and lower surfaces of the document discharged to the document discharge tray 135 are in the overturned state such that the surface facing down when the document is loaded on the document supply tray 134 is turned over to be facing up.

Figure 5A:
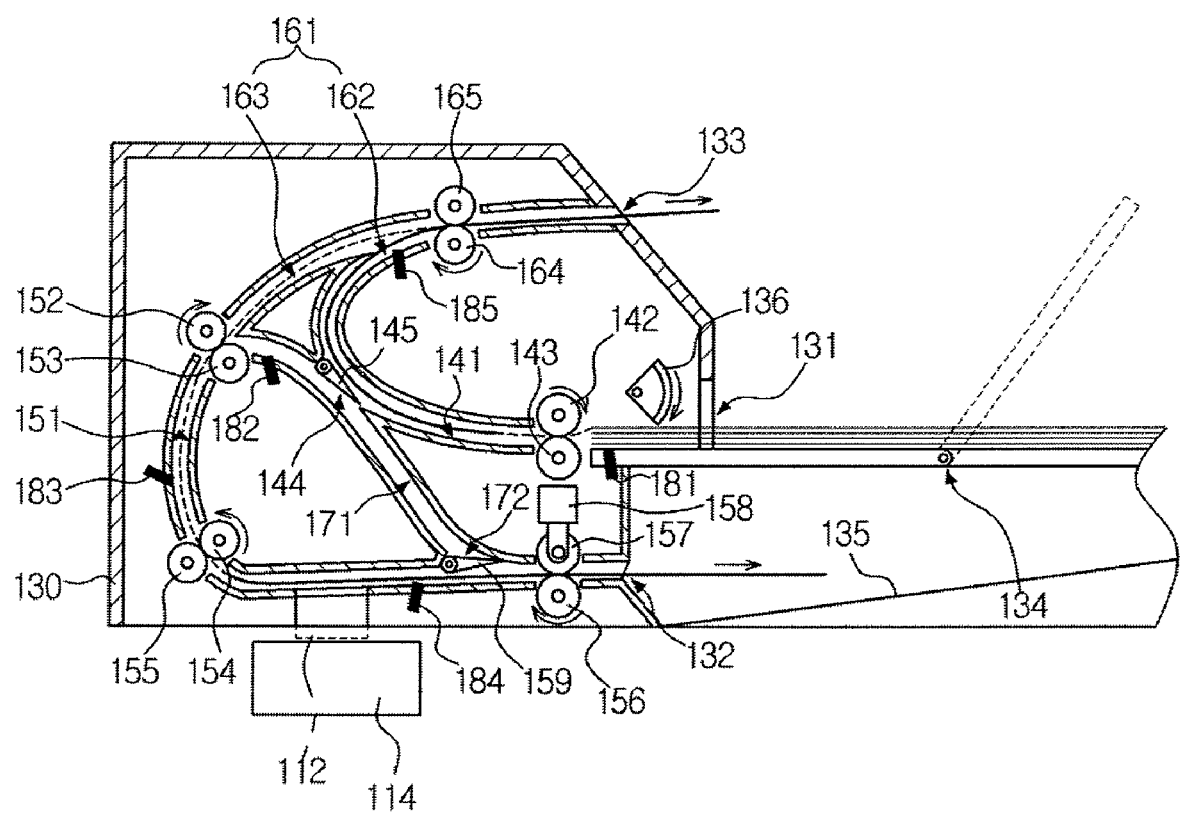
FIGS. 5A-5C are side-sectional views illustrating the process of successively performing the duplex (two-sided) scanning operation in the image reading apparatus in accordance with an exemplary embodiment of the present general inventive concept.
Figure 5B:
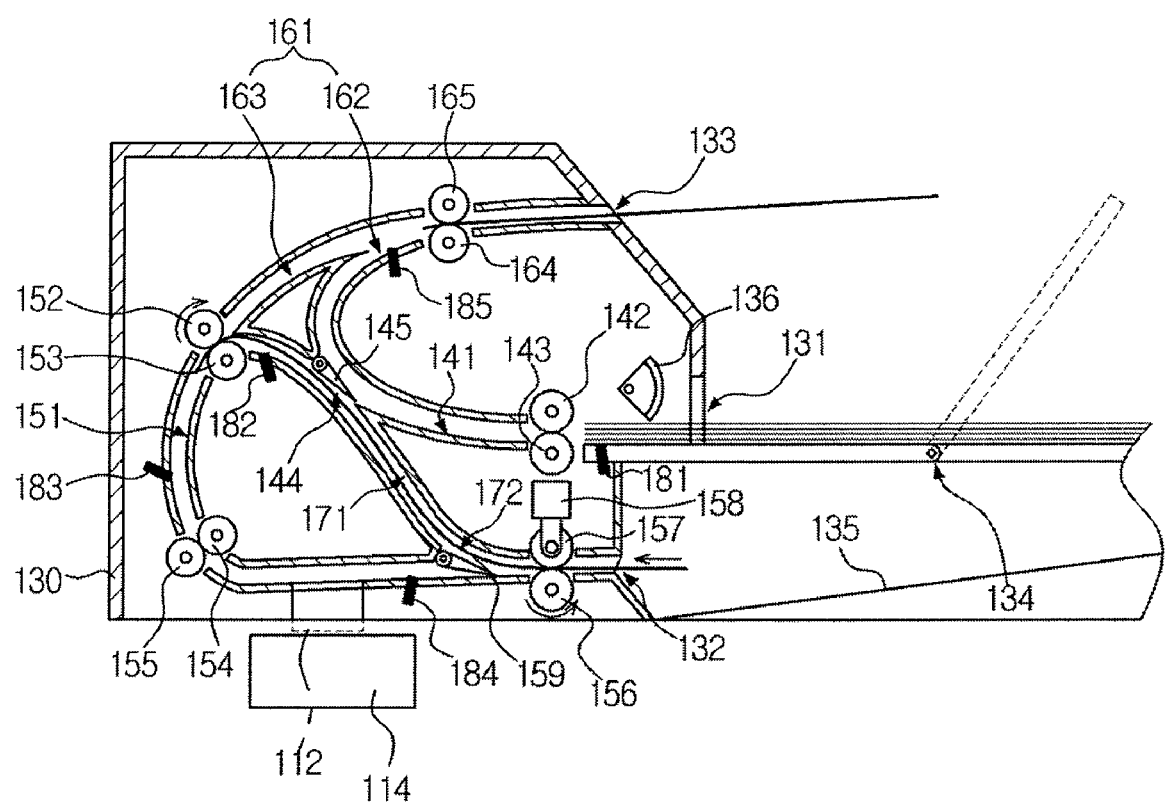
Figure 5C:
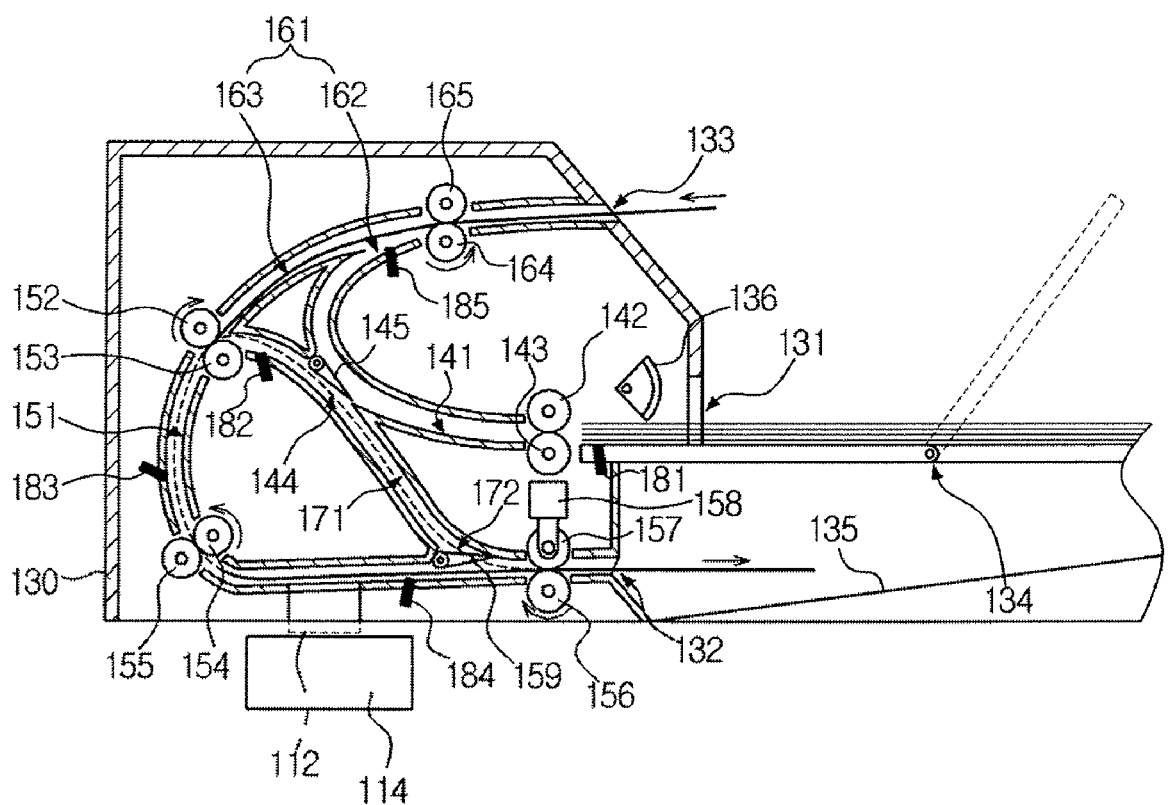

FIGS. 5A to 5C illustrate an exemplary process of successively performing duplex scanning operations with respect to multiple documents.

As illustrated in FIG. 5A, when the duplex scanning operation is successively performed, the first document guide 144 opens the auxiliary supply path 161 (e.g., the overturn path 162) and guides the document fed through the main feed path 141 to the auxiliary supply path 161. The preceding document sheet is fed to the scanning window 112 through the auxiliary supply path 161 and the simplex path 151. When the rear end of the preceding document sheet passes by a prescribed position or the scan sensor 183, the pickup device 136 picks up the next document loaded on the document supply tray 134.

As illustrated in FIG. 5B, after one surface of the preceding document sheet is scanned, the preceding document sheet is fed to the duplex path 171 by the discharge roller 156 that rotates in the reverse direction and the second document guide 159. As illustrated in FIG. 5B, the following document sheet fed to the auxiliary supply path 161 stays at a predetermined position while being held between the overturn roller 164 and the idle roller 165.

As illustrated in FIG. 5C, the preceding document sheet is fed to the scanning window 112 through the duplex path 171 and the simplex path 151 to scan the other surface thereof. Then, the preceding document sheet is discharged through the document discharge port 132 by the discharge roller 156 that rotates in the forward direction. When the rear end of the preceding document sheet passes by the document interval adjusting sensor 182, the overturn roller 164 rotates in the reverse direction to feed the following document sheet standing by in the auxiliary supply path 161 to the simplex path 151 through the auxiliary feed path 163 while the predetermined or desired interval (e.g., 60 mm) is maintained with respect to the preceding document sheet. The following document sheet is fed to the scanning window 112 and one surface thereof is scanned. When the rear end of the following document sheet passes by the scan sensor 183, the pickup device 136 picks up another document loaded on the document supply tray 134.

As described above, in an exemplary method according to the present general inventive concept, since the document supply processes are rapidly performed one after another, the whole scanning time of the documents (e.g., duplex scan of multiple page documents) can be shortened.

Figure 6:
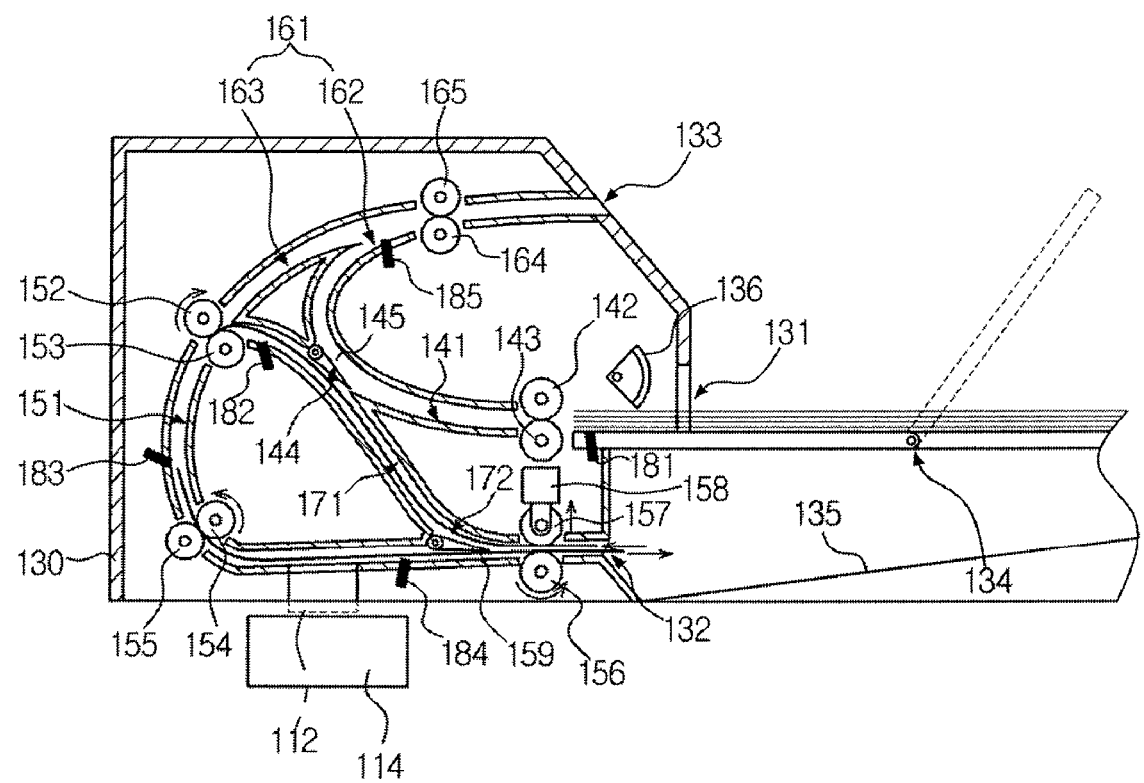
FIG. 6 is a side-sectional view illustrating the process of successively performing the duplex (two-sided) scanning operation when varying the document feed timing in the image reading apparatus in accordance with an exemplary embodiment of the present general inventive concept.

FIG. 6 illustrates the state in which portions of two documents are overlapped in the simplex path 151 by varying the timing of feeding the preceding document sheet and the following document sheet. When two documents are overlapped between the discharge roller 156 and the discharge idle roller 157, the discharge idle roller 157 ascends away from the discharge roller 156 by the elevation device 158. Accordingly, two documents may be fed in the respective progressing directions without being influenced by the discharge roller 156.

The present general inventive concept of feeding documents and/or determining the timing of feeding the documents is not intended to be restricted to such exemplary method or apparatus embodiments, in contrast, it can be widely varied so as to rapidly perform scanning operation (e.g., duplex) and shorten the whole scanning time. Further, the document may be registered by the feed roller 152 instead of the scan roller 154.

Any reference in this specification to "one embodiment," "an embodiment," "example embodiment." etc. means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As apparent from the above description, according to image reading apparatuses and methods of the present general inventive concept, during the successive duplex scanning operation with respect to the plural documents, while the preceding document sheet is scanned, the following document sheet is picked up and internally positioned (e.g., totally internal or partially internal) or may temporarily stand by in an auxiliary supply path. When the preceding document sheet is discharged, the following document sheet may be scanned (e.g., fed to the scanning window) at a predetermined time/distance interval with the preceding document sheet. Accordingly, the scanning time is shortened or minimized.

Further, the discharged documents are accumulated on the document discharge tray in order although the upper and lower surfaces of the documents may be reversed from the loaded state on the document supply tray. Thus, it is not necessary to separately arrange the scanned discharged documents.

Further, an auxiliary supply path or auxiliary location may position, delay or hold a document, set a prescribed time/distance interval between serial printing medium sheets, or allow a document (e.g. fed through the main feed path) to temporarily stand by before being fed to a scanning window or simplex path.

Although embodiments of the present general inventive concept have been illustrated and described, it would be appreciated by those skilled in the art that changes may be made in these embodiments without departing from the principles and spirit of the general inventive concept, the scope of which is defined in the claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with comprising (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A document supply device of an image reading apparatus, comprising:
   a frame configured to have a document supply port and a document discharge port to discharge the document having passed a scanning window;
   a main feed path to guide a document introduced through the document supply port;
   a simplex path branched off the main feed path to guide the document from the main feed path to a scanning window to scan one surface of the document;
   a duplex path to guide the document having passed the scanning window to the simplex path to scan the other surface of the document;
   an auxiliary supply path branched off from the main feed path and connected to the simplex path configured to temporarily position the document fed through the main feed path before being fed through the simplex path to the scanning window, the auxiliary supply path including:
      an overturn path branched off from the main feed path and to guide the document so that upper and lower surfaces of the document are turned over, and
      an auxiliary feed path to guide the document fed to the overturn path to the simplex path and having an overturn roller to rotate in a forward direction and a reverse direction, the overturn roller to rotate in the forward direction to feed the document from the main feed path to the overturn path, and the overturn roller to rotate in the reverse direction to feed the document from the overturn path to the simplex path through the auxiliary feed path; and
   plural rollers to feed the document through the main feed path, the simplex path, the duplex path and the auxiliary supply path, the plural rollers including a discharge roller mounted at the frame near the document discharge port and capable of rotating in a forward direction and a reverse direction, such that when the discharge roller rotates in the forward direction, the document having passed the scanning window is fed to the document discharge port, and when the discharge roller rotates in the reverse direction, the document having passed the scanning window is fed to the duplex path.

2. The document supply device according to claim 1, wherein the auxiliary feed path is provided with an overturn sensor to detect the document fed to the auxiliary feed path.

3. The document supply device according to claim 1, further comprising:
   a first document guide in a junction portion of the main feed path, the simplex path and the auxiliary supply path, the first document guide to selectively guide the document fed through the main feed path to the simplex path or the auxiliary supply path.

4. The document supply device according to claim 1, further comprising:
   a second document guide between the scanning window and the discharge roller to guide the document fed by the reverse rotation of the discharge roller to the duplex path.

5. The document supply device according to claim 1, further comprising:
   a discharge idle roller configured to contact the discharge roller to enable the discharge roller to feed the document or disengage the discharge roller to reduce the discharge roller influence on the feeding of the document.

6. The document supply device according to claim 1, further comprising:
   a discharge sensor between the scanning window and the document discharge port to detect the document passing by the scanning window.

7. The document supply device according to claim 1, wherein the simplex path is provided with a scan roller on an upstream side of the scanning window to feed the document introduced into the simplex path to the scanning window, wherein the scan roller is configured to temporarily stop rotating to register a front end of the document fed to the simplex path.

8. The document supply device according to claim 7, wherein the simplex path is further provided with a scan sensor on an upstream side of the scan roller to detect the document passing through the simplex path.

9. The document supply device according to claim 1, further comprising:
   a document supply tray coupled to the frame to load the document to be supplied to the document supply port, the document supply tray having a foldable configuration.

10. A multi-directional print medium guide device of an image forming apparatus, comprising:
   a frame configured to have a document supply port and an opening;
   a main feed path to guide a document introduced through the document supply port;
   a simplex path branched off the main feed path to guide the document from the main feed path to a scanning window to scan one surface of the document;
   a duplex path to guide the document having passed the scanning window to the simplex path to scan the other surface of the document;
   an auxiliary supply path branched off from the main feed path and connected to the simplex path configured to temporarily position the document fed through the main feed path before being fed through the simplex path to the scanning window, the auxiliary supply path including:
      an overturn path branched off from the main feed path and to guide the document so that upper and lower surfaces of the document are turned over, and
      an auxiliary feed path to guide the document fed to the overturn path to the simplex path and having an overturn roller to rotate in a forward direction and a reverse direction, the overturn roller to rotate in the forward direction to feed the document from the main feed path to the overturn path, and the overturn roller to rotate in the reverse direction to feed the document from the overturn path to the simplex path through the auxiliary feed path; and a plurality of rollers to feed the document through the multi-directional print medium guide device, such that the plurality of rollers comprises:
the overturn roller and a fixed idle roller positioned side by side along the auxiliary supply path to feed the document in a forward direction toward the opening or in a reverse direction toward the simplex path.

* * * * *